Dec. 22, 1931.  H. P. PARIS ET AL  1,837,580
APPARATUS FOR DISTRIBUTING AND SPREADING CONCRETE AND LIKE MATERIALS
Filed March 19, 1929  4 Sheets-Sheet 3

INVENTORS
Hugh P. Paris
Albert Knowles
BY
Harry A. Totten
ATTORNEYS.

Dec. 22, 1931.    H. P. PARIS ET AL    1,837,580
APPARATUS FOR DISTRIBUTING AND SPREADING CONCRETE AND LIKE MATERIALS
Filed March 19, 1929    4 Sheets-Sheet 4

INVENTORS
Hugh P. Paris
Albert Knowles
Harry A. Totten
BY
ATTORNEYS.

Patented Dec. 22, 1931

1,837,580

UNITED STATES PATENT OFFICE

HUGH P. PARIS, OF OAKLAND, AND ALBERT KNOWLES, OF SAN FRANCISCO, CALIFORNIA

APPARATUS FOR DISTRIBUTING AND SPREADING CONCRETE AND LIKE MATERIALS

Application filed March 19, 1929. Serial No. 348,155.

The present invention relates to a distributing apparatus designed particularly for receiving material from a truck or other mechanism and for distributing or spreading the material over a predetermined area.

The objects of this invention are to provide a means designed primarily for laying, distributing and spreading concrete for road making purposes and to adapt said apparatus for stationary use, when desired, to discharge concrete into fixed forms. Another object is to provide a means whereby when the apparatus is used for road making purposes that the surface of the sub-grade is smoothed and compressed by the action of the apparatus moving thereover; to provide an apparatus which is adapted for propelling over the sub-grade by power derived from the power plant of the trunk; to provide an apparatus wherein the distributing and spreading means has both lateral and vertical movement.

Further objects are to provide a distributing and spreading unit designed for propulsion in either direction, and which is adapted to be manufactured cheaply, and to operate efficiently and economically in accomplishing the results desired.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the disclosure in the accompanying drawings, wherein—

Figure 1:
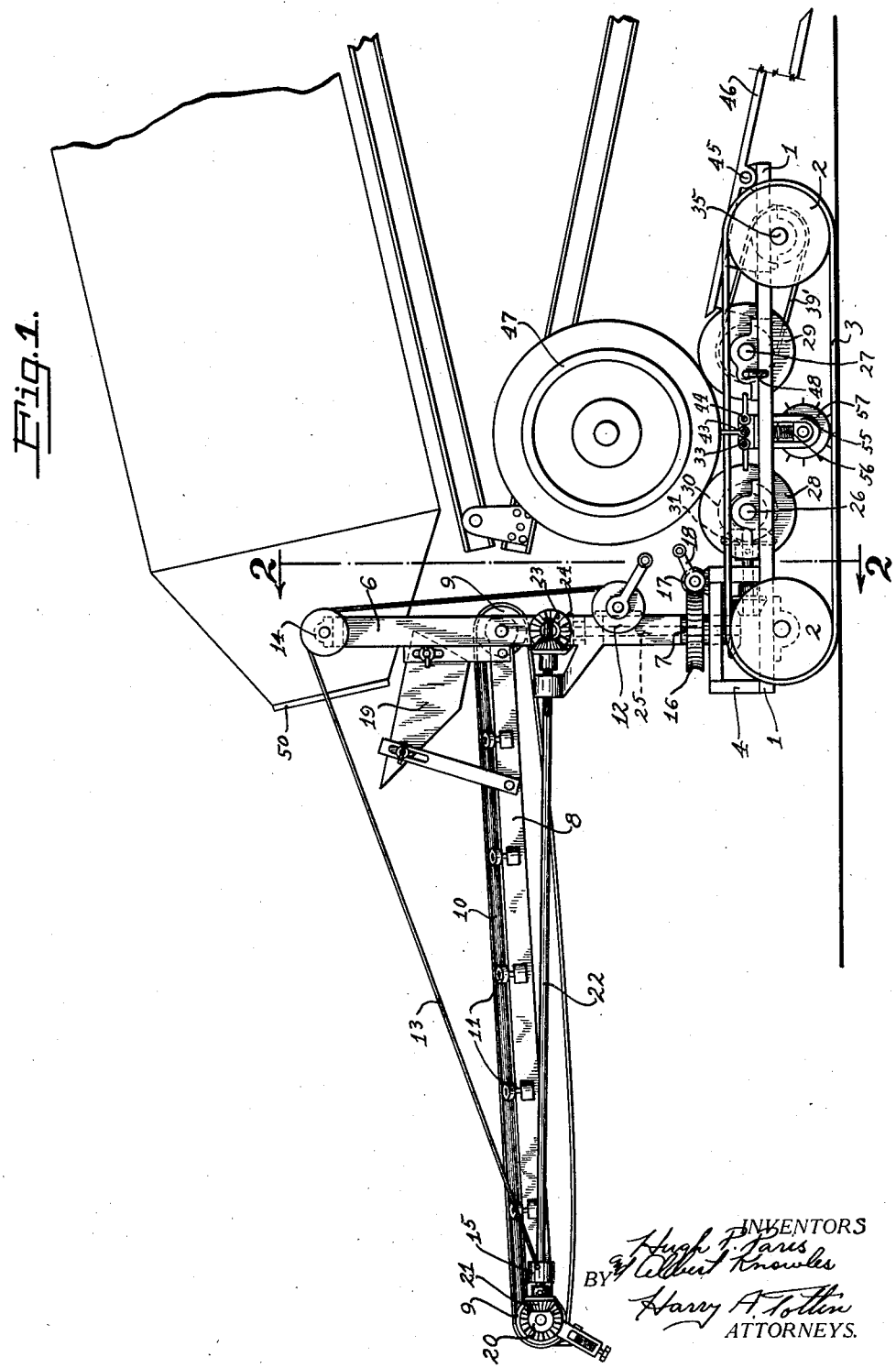
Figure 1 is a view in side elevation of the preferred embodiment, disclosing the rear wheels of a transit mixer in driving relation with the mechanism, and with the discharge of the mixer drum overlying the material hopper.
Figure 2:
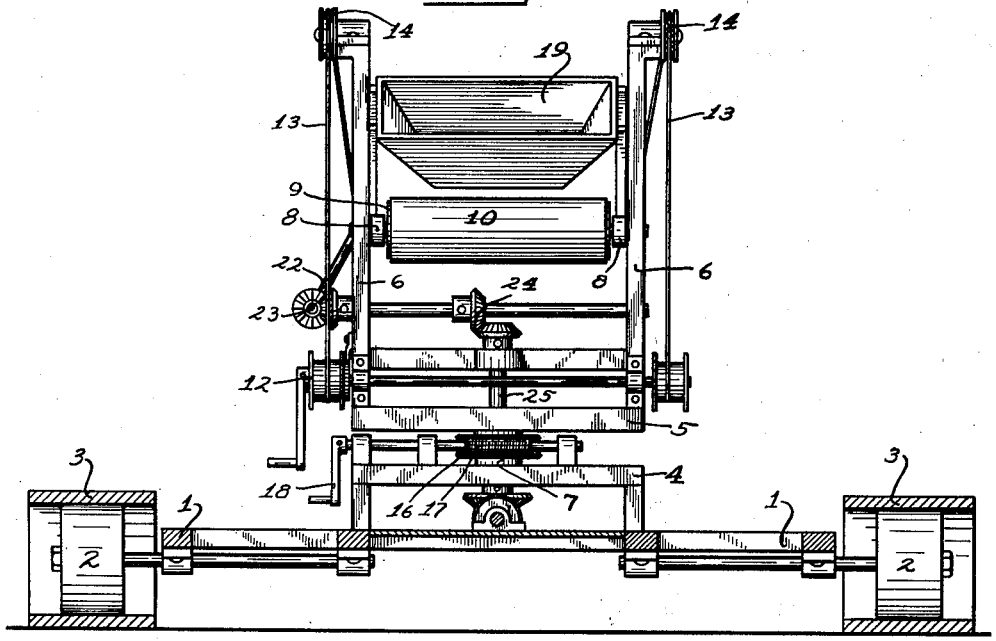
Figure 2 is a transverse, vertical, sectional view, on line 2—2 of Fig. 1, illustrating particularly the means for driving the conveyer, swinging the same from right to left, and adjusting its outer or free end.
Figure 3:
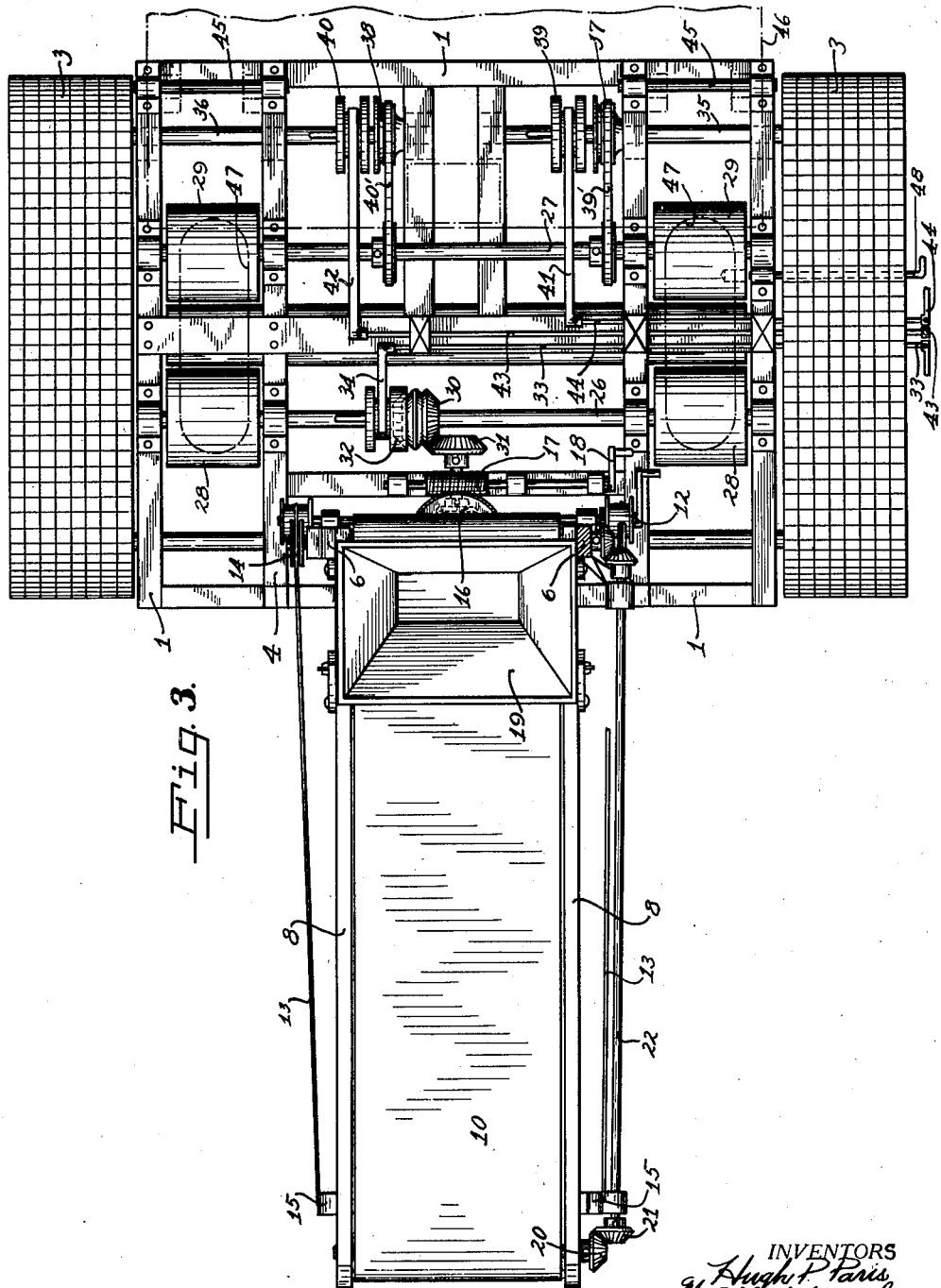
Figure 3 is a view in top plan.

Referring to the drawings, the numeral 1 indicates a suitable apparatus frame, open and substantially rectangular in plan. This frame carries at its opposite sides track supporting wheels 2, about each pair of which extends an endless track 3, of any well known type. At its front end the frame 1 supports an auxiliary frame 4, upwardly from which extends an open frame, vertically disposed, and preferably consisting of the base member 5 and side members 6, this open frame being fulcrumed for pivotal movement on a vertical axis through a collar 7 resting on the frame 4. The open frame, hereinafter termed the conveyer frame, pivotally mounts the rear ends of conveyer frame members 8, extending upwardly therefrom, said members mounting at their opposite ends conveyer supporting rollers 9, over which operate the endless belt conveyer 10, of any desired structure. The upper flight of the belt is preferably maintained trough-shaped by the side or curling rollers 11, carried by the frame member 8 throughout its length. The outer end of the conveyer is adapted to be raised and lowered to the desired inclination by the operation of a winch 12, mounted on the frame 6, and which affords a take-up for the cables 13, passing over sheaves 14 at the upper end of frame 6, the cables being connected to the frame 8, near its outer end by members 15.

The frame 6, in the region of the collar 7, carries a worm gear 16, with which engages a worm 17 adapted for operation on the rotation of a crank 18 to cause lateral swinging movement of the frame 8.

Above the inner end of the conveyer there is preferably positioned an adjustable hopper 19 for receiving the material to be distributed by the conveyer. To impart endless travelling movement to the conveyer, the outer roller 9 carries on its end a gear 20 which has driving connection at 21 with a shaft 22 projecting upwardly from a bearing, carried by the frame 6. The shaft 22 has driving connection at 23 and 24 with a suitable drive shaft 25 extending upwardly through the collar 7, the shaft being rotated by the hereinafter described mechanism.

Disposed transversely of the frame 1 are suitable parallel spaced rotary shafts 26 and 27. These respective shafts mount on their ends friction driven rollers 28 and 29, the rollers at the opposite ends of the respective shafts being spaced from each other, corresponding to the standard tread of a motor driven vehicle. The shaft 26 has connection through a gear 30, intermeshing with a pinion 31, which connects drivably with shaft 25. A clutch 32, keyed to shaft 26, is adapted for operation to cause simultaneous rotation of the gear 30 and pinion 31, this operation imparting endless travel to the conveyer belt 10. The clutch is adapted to be thrown in or out of engagement with its cooperating part by the longitudinal movement of an operating rod 33 carrying a forked member 34 engaging the clutch. The track supporting wheels 2, at the rear end of the apparatus, are carried on the outer ends of the respective shafts 35 and 36, and mounted on the respective shafts are clutch discs 37 and 38, adapted for free rotation on the shafts, and driven through flexible driving connections 39' and 40' from the shaft 27.

Cooperating with the clutch discs 37 and 38 are the friction clutch members 39 and 40, keyed to their respective shafts to slide longitudinally thereon and respectively operated by the forked arms 41 and 42 on the ends of operating rods 43 and 44 extending beyond one side of the frame.

Transversely disposed at one end of the frame are the runway supporting bars 45, forming fulcrum mountings for the inclined runway boards 46, over which travel the rear vehicle wheels 47. One end of each board 46 is adapted to rest on the ground, and the other to be disposed in close contact with its associated friction driven roller 28 or 29.

With the parts assembled, as previously described, the operator of the transit mixer backs the rear wheels of the mixer upwardly over the runway boards 45, until they rest in engagement one with the respective pairs of friction rollers 28 and 29, at opposite ends of the shafts 26 and 27, these being clearly illustrated in Fig. 1.

In accomplishing this positioning movement, a locking pin 48, carried by the side frame member, is moved into locking engagement with its associated roller 29, thus the passage of the wheels 47 over the rollers 29 will not impart longitudinal movement to the frame, and at the same time the rollers will be locked in stationary position.

With the truck positioned as in Fig. 1, and with the truck power plant operating the rear wheels 47, said wheels transmit power to the rollers 28 and 29, causing the rotation of the respective shafts 26 and 27. When in this position, the mixer element is elevated with its discharge end 50 dumping into hopper 19. The operating mechanism 33 for the clutch element 32 is moved to engaged position, causing the operation of the belt 10 to convey the material delivered into the hopper longitudinally of the conveyer, and to discharge the same from its outer end. The operator manipulates the control members for the clutch elements 39 and 40, to throw the same into and out of engagement with their associated members, so that the power from the wheels 47 will be transmitted through the rollers 29 to endless tracks 3, and the apparatus will be propelled over the road surface, the manipulation of the clutch elements in timed relation enabling the steering of the distributing apparatus, as desired.

It will thus be apparent that in this embodiment the power from the mixer serves as a propelling medium for the distributor.

Figure 4:
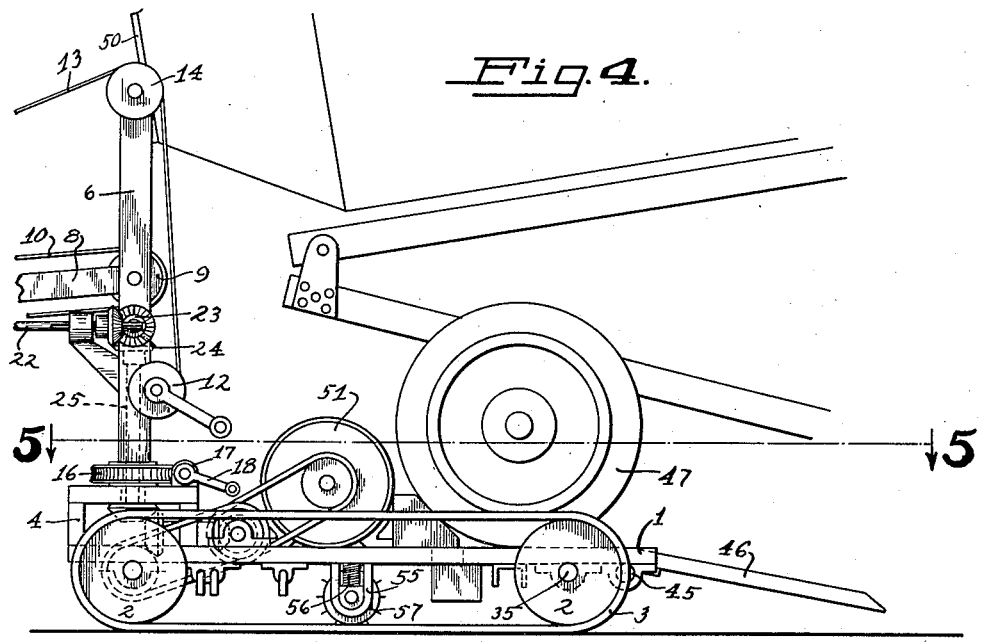
Figure 4 is a view in side elevation of a modified structure, mounting a self contained driving motor, and illustrating the rear wheels of a transit mixer resting on the distributing frame.
Figure 5:
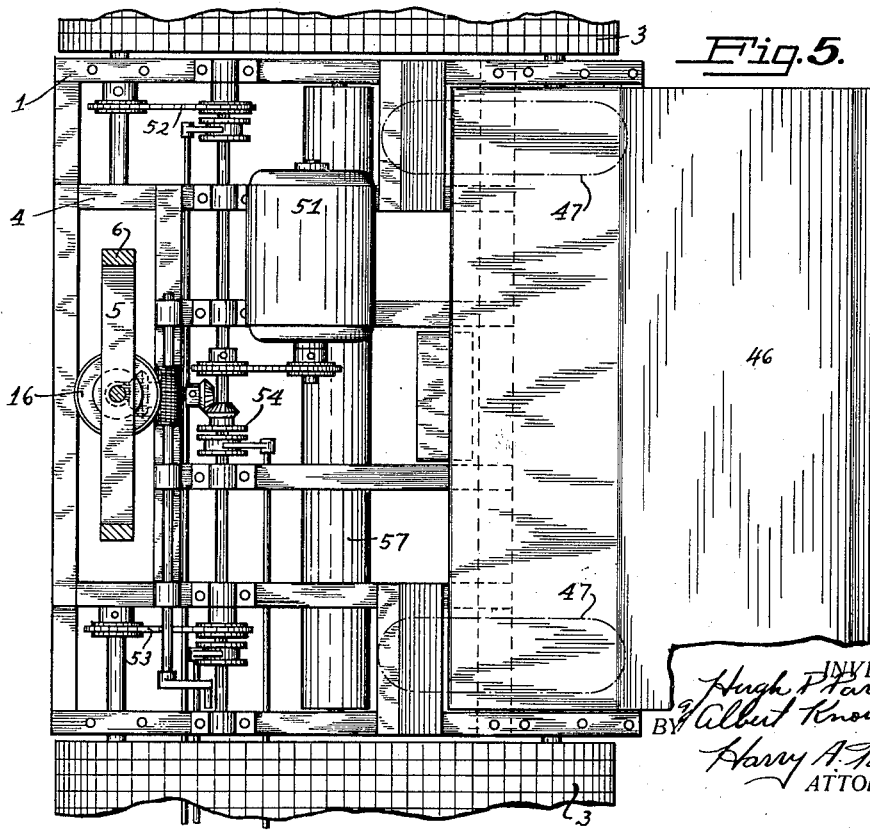
Figure 5 is a transverse sectional view in plan, on line 5—5 of Fig. 4.

In the modification—Figs. 4 and 5, a self-contained power plant 51, in the form of a motor, is provided, it affording driving means through clutch controlled mechanisms 52 and 53 to the endless tracks 3. It also affords a power means through clutch controlled mechanism 54 for imparting movement to the conveyer 10.

In this embodiment, the rear wheels of the truck are merely backed onto a supporting platform and the power of the truck is not required or relied upon to propel the distributing apparatus.

Disposed transversely of the undersurface of the frame, carried by brackets 55 and forced into contact with the road surface by yieldable means 56, is a levelling roller 57, of a length to extend between the endless tracks 3, and thus smooth any uneven places in the road surface between tracks 3 prior to the laying of the concrete thereon.

We claim:—

1. In combination with a mobile distributor for concrete and like materials, a supporting mechanism for the distributor for operation to propel the same, a conveying apparatus carried by the distributor, and means cooperating with the supporting mechanism and operated by the drive wheels of an automobile concrete mixer on the positioning of the latter to discharge onto the conveying apparatus, whereby power from the automobile propels the distributor and operates said conveying apparatus for effecting distribution of the concrete as the distributor advances.

2. In combination with a mobile distributor for concrete and like materials, a supporting mechanism for the distributor for operation to propel the same, a conveying apparatus carried by the distributor, and means cooperating with the supporting mechanism and operated by the drive wheels of an automobile concrete mixer on the positioning of the latter to discharge onto the conveying apparatus, whereby power from the automobile propels the distributor and operates said conveying apparatus, said means including friction rollers for supporting the automobile driving wheels, and clutch elements for operatively connecting the rollers with the distributor supporting mechanism and the conveying apparatus whereby distribution of the concrete is effected as the distributor advances.

3. In combination with a mobile distributor for concrete and like materials, a supporting mechanism for the distributor for operation to propel the same, a conveying apparatus carried by the distributor, and means cooperating with the supporting mechanism and operated by the drive wheels of an automobile concrete mixer on the positioning of the latter to discharge onto the conveying apparatus, whereby power from the automobile propels the distributor, said means including clutch controlled mechanism cooperating with the conveyer whereby power from the automobile operates said conveyer for effecting distribution of the concrete as the distributor advances.

4. The combination in a mobile distributor for concrete and like materials, of a carriage, an endless conveyer mounted for swinging movement laterally beyond one end of the carriage, and clutch controlled means actuated by the drive wheels of an automobile concrete mixer for propelling the carriage and operating the conveyer while the mixer is in a position to discharge onto said conveyer whereby distribution of the concrete is effected as the distributor advances.

5. The combination in a mobile distributor for concrete and like materials, of a carriage, an endless conveyer on the carriage for receiving and distributing the material delivered to the carriage, means on the carriage for receiving a power driven mixer apparatus and for supporting a portion thereof while the latter discharges onto the conveyer, and clutch controlled mechanism for receiving power from said mixer apparatus for propelling said carriage and for operating said conveyer whereby distribution of the concrete is effected as the distributor advances.

6. In combination with a mobile distributor for concrete and like materials, endless supporting tracks therefor for supporting and propelling the same, a conveyer means on the distributor for receiving and distributing the material delivered to the distributor, friction drive rollers arranged in pairs on said distributor for receiving the drive wheels of an automobile concrete mixer, and clutch controlled means between said endless tracks and rollers and between said conveyer means and rollers for operatively connecting and disconnecting the same whereby distribution of the concrete is effected as the distributor advances.

7. In combination with a mobile distributor for concrete and like materials, endless supporting tracks therefor for supporting and propelling the same, a conveyer means on the distributor for receiving and distributing the material delivered to the distributor, friction drive rollers arranged in pairs on said distributor for receiving the drive wheels of an automobile concrete mixer, separate clutch controlled means between respective pairs of rollers and opposite endless tracks whereby said tracks are adapted for selective operation by power delivered from the drive wheels of the mixer, and clutch elements for operatively connecting the rollers with said conveyer means whereby distribution of the concrete is effected as the distributor advances.

In testimony whereof we have signed our names to this specification.

HUGH P. PARIS.
ALBERT KNOWLES.